US007555185B2

(12) United States Patent
Laprade et al.

(10) Patent No.: US 7,555,185 B2
(45) Date of Patent: Jun. 30, 2009

(54) MICROCHANNEL PLATE WITH SEGMENTED MOUNTING PADS

(75) Inventors: Bruce N. Laprade, Holland, MA (US); Francis Langevin, Brimfield, MA (US)

(73) Assignee: Burle Technologies, Inc., Wilmington, DE (US)

(*) Notice: Subject to any disclaimer, the term of this patent is extended or adjusted under 35 U.S.C. 154(b) by 572 days.

(21) Appl. No.: 11/217,873

(22) Filed: Sep. 1, 2005

(65) Prior Publication Data

US 2007/0236118 A1 Oct. 11, 2007

Related U.S. Application Data

(60) Provisional application No. 60/607,060, filed on Sep. 3, 2004.

(51) Int. Cl.
*G02B 6/032* (2006.01)

(52) U.S. Cl. ....................... 385/125; 385/115; 385/116; 385/120

(58) Field of Classification Search ................. 385/120, 385/116, 115, 125; 65/405, 106, 407, 408, 65/409, 410, 30.12; 313/103 R
See application file for complete search history.

(56) References Cited

U.S. PATENT DOCUMENTS

| | | | | |
|---|---|---|---|---|
| 4,737,013 | A * | 4/1988 | Wilcox | 385/120 |
| 4,849,000 | A * | 7/1989 | Patrick | 65/393 |
| 4,886,537 | A * | 12/1989 | Patrick | 65/393 |
| 6,311,001 | B1 * | 10/2001 | Rosine | 385/120 |
| 6,876,802 | B2 * | 4/2005 | Rosine et al. | 385/120 |
| 7,251,400 | B1 * | 7/2007 | Jacksen | 385/120 |
| 2007/0236118 | A1 * | 10/2007 | Laprade et al. | 313/103 R |

* cited by examiner

*Primary Examiner*—Brian M Healy
(74) *Attorney, Agent, or Firm*—Dann, Dorfman, Herrell and Skillman, P.C.

(57) ABSTRACT

A microchannel plate and a method of making same are disclosed. The microchannel plate has an active area and at least one solid glass pad. The active area has a plurality of microchannels formed therein. The solid glass pad or pads are formed within the active area, and preferably at peripheral locations, for mounting the microchannel plate. With this arrangement, shrinkage of the microchannel plate during fabrication and hydration induced swelling of the active area after fabrication of the microchannel plate do not result in catastrophic warping or cracking of the microchannel plate.

6 Claims, 10 Drawing Sheets

MICROCHANNEL PLATE WITH SEGMENTED MOUNTING PADS

This application claims the benefit of U.S. Provisional Application No. 60/607,060, filed Sep. 3, 2004.

BACKGROUND OF THE INVENTION

Microchannel plates (MCP's) are high gain, low noise, solid-state electron multipliers consisting of millions of tiny, alkali doped lead glass channels all fused together into a solid array. FIG. 1 is a photomicrograph illustrating the microchannel structure. These devices are sensitive to a wide range of charged particles and electromagnetic radiation and are fabricated in sizes ranging from 3 to 150 millimeters in diameter.

In operation as shown in FIG. 2, charged particles (ions, electrons) or electromagnetic radiation (UV Photon, Soft X-Rays) impinge on the input side of the array with sufficient energy to generate secondary electrons. The secondary electrons accelerate through the channel toward the output side of the channel, driven by the ever increasing positive electric potential created by current flowing within the resistive layer of the channel structure. Subsequent collisions of the secondary electrons with the channel wall create further secondary electrons in a cascade until the charge exits the channel and is recorded on a readout device. Varying the voltage applied across the array will vary the gain by influencing the number of collisions and the number of secondary electrons generated upon each successive collision with the channel wall.

Typical microchannel plates can produce approximately 10,000 electrons for every single charged particle impinging on the input surface. Microchannel plates can be stacked together in order to obtain improved performance. When two MCP's are stacked, the resultant device has a typical gain of about 10,000,000 ($10^7$). Stacking three MCP's together provides a gain of up to about 100,000,000 ($10^8$).

Microchannel plates were originally developed for image intensifiers used in night vision scopes. Today, microchannel plates are used in a wide variety of commercial and scientific applications ranging from space exploration (the Hubble Space Telescope contains several instruments employing microchannel plates) to semiconductor processing, to drug discovery, cancer research, and anti-terrorist activities. Microchannel plates are no longer limited to the small formats developed for night vision and are produced in sizes ranging from 3 to 150 mm in diameter or other major dimension. Shown in FIG. 3 are some known product forms of microchannel plates.

The applications in which microchannel plates are used rely on the high sensitivity of the microchannel plate to detect and amplify weak signals, which contain complex information that would not be detected without the use of the MCP. Microchannel plate detectors in medical instruments enable blood analyzers to function. Mass spectrometers with parts per billion analysis capabilities only function when equipped with MCP detectors. Many pharmaceutical and medical breakthroughs of the last 10 years would not have occurred if it were not for microchannel plates. Unlike MCP's used in image intensifier tubes, MCP's for analytical instruments frequently need to be cycled from high vacuum to atmospheric pressure.

In order to operate a microchannel plate it must be mounted in a conductive fixture which makes electrical contact to the electrodes which are formed on each side of the plate. The electrodes are used to apply the high voltage needed to create an electric field within the channels that sustains the secondary electron emission. When microchannel plates were first invented, they had very large pores (i.e., about 50 microns in diameter) and thick channel walls (i.e., about 12 microns thick). They had active channels extending all the way out to the very edge of the MCP as shown in FIG. 4. Making electrical connection to such a structure was accommodated by simply sandwiching the MCP disk between two metal washers.

That structure provided very good support for the MCP and was successfully optimized for high shock and vibration environments. The relatively wide channel walls easily supported the structure with enough surface area to make good electrical contact without causing mechanical damage to the array.

One serious drawback with the known approach is that the sandwiching of the MCP between two metal washers effectively closed off hundreds of channels beneath the metal washers. That results in trapping of gas at atmospheric pressure inside the covered channels. All microchannel plates must operate in a high vacuum environment and therefore, when the MCP was subjected to vacuum, the trapped gas would slowly diffuse from the pores. Such diffusion significantly increased the pump down time for the device. Failure to evacuate these channels thoroughly could lead to ignition of the gas into a plasma when the high voltage was applied to the MCP. The plasma burns the metallized electrodes and may even melt the glass structure, thereby generating noise and rendering the array useless.

Needs in the market place have continuously driven MCP manufacturers to make devices having smaller pores. Smaller pores have thinner channel walls which further complicates the-mounting process because the thinner channel walls may lead to crushing of the channel walls during mounting in an operative device. Crushed channel walls cause noise problems during operation of the microchannel plate.

In an effort to make mounting of small pore (i.e., less than about 25 microns in diameter) microchannel plates more reliable, a solid glass border 12 which completely surrounds a defined active area 14 was used, as shown in FIG. 5. The addition of the solid glass border 12 to the microchannel plate 10 successfully eliminated the problems associated with mounting MCP's which have active channels out to the edge. The addition of the solid glass border did however create a new significant problem.

More specifically, the addition of the solid glass border introduced a severe problem with spontaneous warping and cracking of the microchannel plate. Microchannel plates are manufactured from alkali doped lead silicate glass. The active surfaces of a microchannel plate, within the channels are essentially a fired silica gel. This surface is known to be very hygroscopic, that is, it absorbs water vapor readily from the ambient environment. The composition of the channel walls of a microchannel plate, regardless of glass type or manufacturer, are chemically almost identical to that material used in silica desiccating packs used to absorb water and keep clothing, electronics, and other products dry.

The porous nature of the microchannel plate structure means that the active area can have several hundred times the surface area of the nonporous solid glass rim. When microchannel plates are manufactured they are machined parallel and flat to within 20 microns. When hydration occurs, the active area 14 swells as illustrated in FIG. 6 and begins to expand in the directions illustrated by the arrows. As the active area 14 expands it begins to push against the solid glass border 12 which expands at a much slower rate, based on the difference in the surface area. Continued expansion of the active area 14 causes the microchannel plate 10 to become distorted, i.e., concave on one side and convex on the other. Further expansion of the active area 14 will eventually cause the solid glass border 12 to fail in tension by cracking. The classic hydration failure is characterized by a crack originating at the edge of the MCP 10 and extending toward the center of the MCP. The crack is wider at the perimeter of the solid glass rim 12 than in the center of the active area 14. This behavior can be modeled using hoop stress equations.

Hydration failures may be prevented by keeping the MCP stored in a good vacuum. However, microchannel plates are now used in many applications that require cycling to ambient atmosphere and the continuous vacuum treatment is no longer feasible or cost effective.

In order to resolve this problem it is necessary to build a microchannel plate structure which will tolerate an expansion of the active area and provide a mounting structure which will provide good electrical contact, without damaging the active channels. The desired structure should not trap gas within unused channels.

SUMMARY OF THE INVENTION

In accordance with a first aspect of the present invention there is provided a microchannel plate which has an active area and at least one solid glass pad. The active area has a plurality of microchannels formed therein. The solid glass pad or pads are formed within the active area for mounting the microchannel plate in an operative device. With this arrangement, shrinkage of the microchannel plate during fabrication and hydration and swelling of the active area after fabrication of the microchannel plate do not result in catastrophic warping or cracking of the microchannel plate.

In accordance with another aspect of the present invention, there is provided a method of making a microchannel plate. The method includes the step of assembling an array of elongated multi-fibers in a vessel. At least one segment array of elongated cane fibers is inserted at a location within the array of elongated multi-fibers in the vessel to form a fiber assembly. The fibers in the fiber assembly are then fused together to form a billet. In a preferred embodiment of the method according to this invention, two or more segment arrays of the elongated cane fibers are inserted in the multi-fiber array at spaced locations around the periphery of the multi-fiber array.

BRIEF DESCRIPTION OF THE DRAWINGS

The following description will be better understood when read in connection with the drawings, wherein.

DESCRIPTION OF A PREFERRED EMBODIMENT OF THE INVENTION

Figure 1:
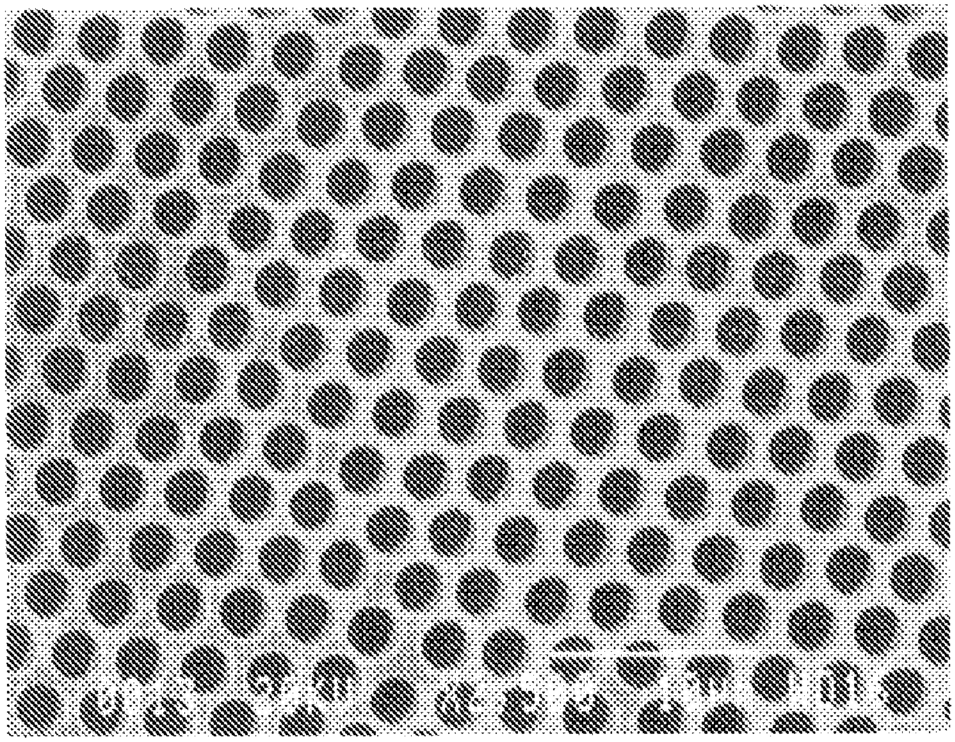
FIG. 1 (PRIOR ART)
FIG. 1 is a photomicrograph of a portion of a microchannel plate.
Figure 2:
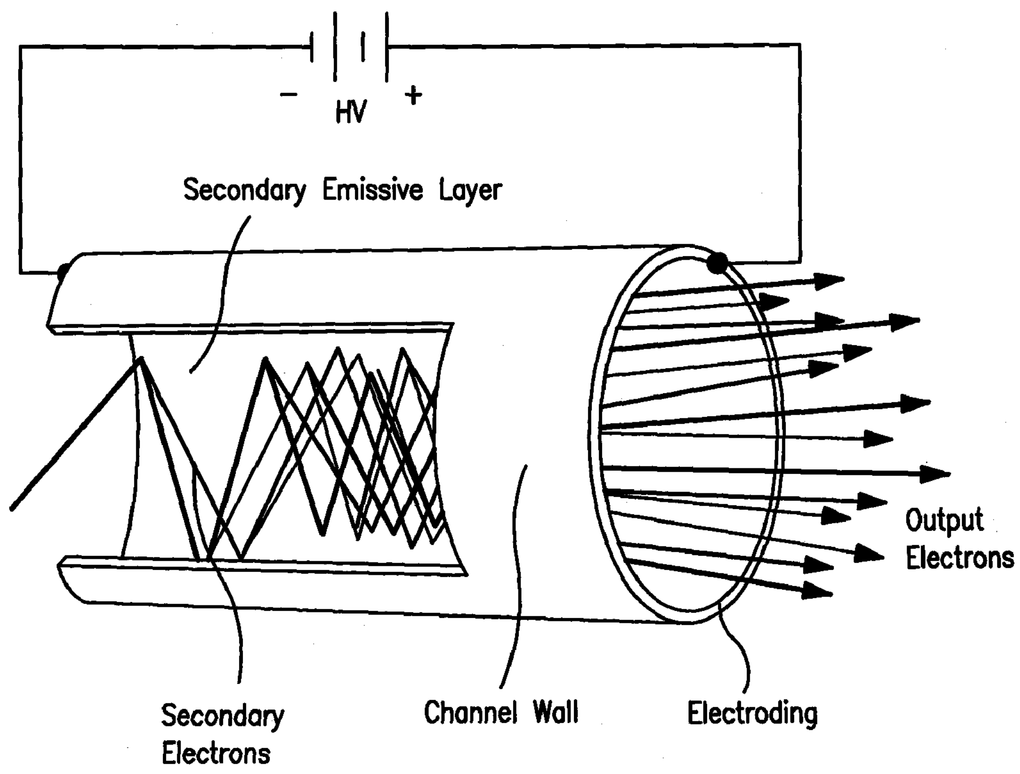
FIG. 2 (PRIOR ART)
FIG. 2 is a schematic diagram of a single channel of a microchannel plate.
Figure 3:
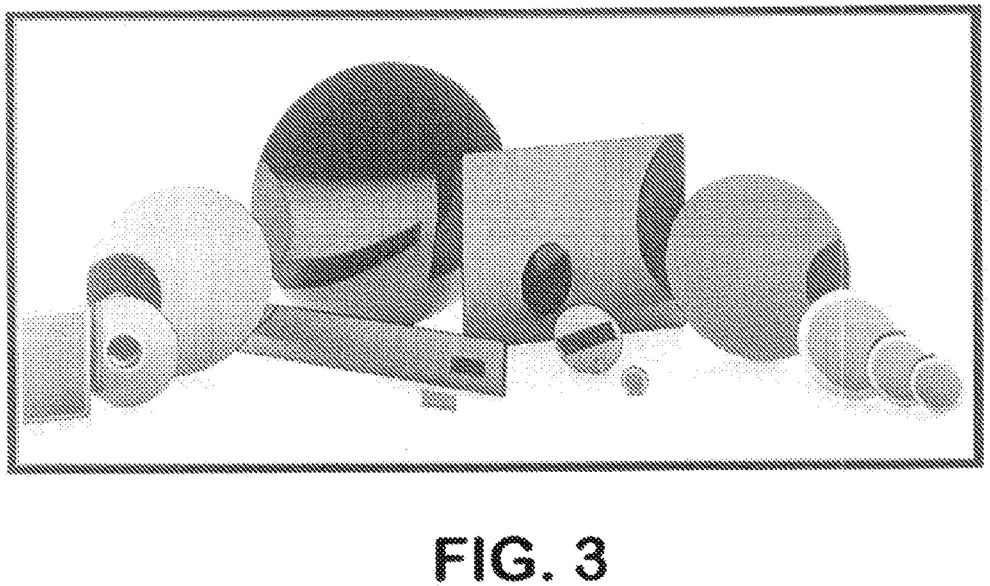
FIG. 3 (PRIOR ART)
FIG. 3 is a photograph of a variety of microchannel plate product forms.
Figure 4:
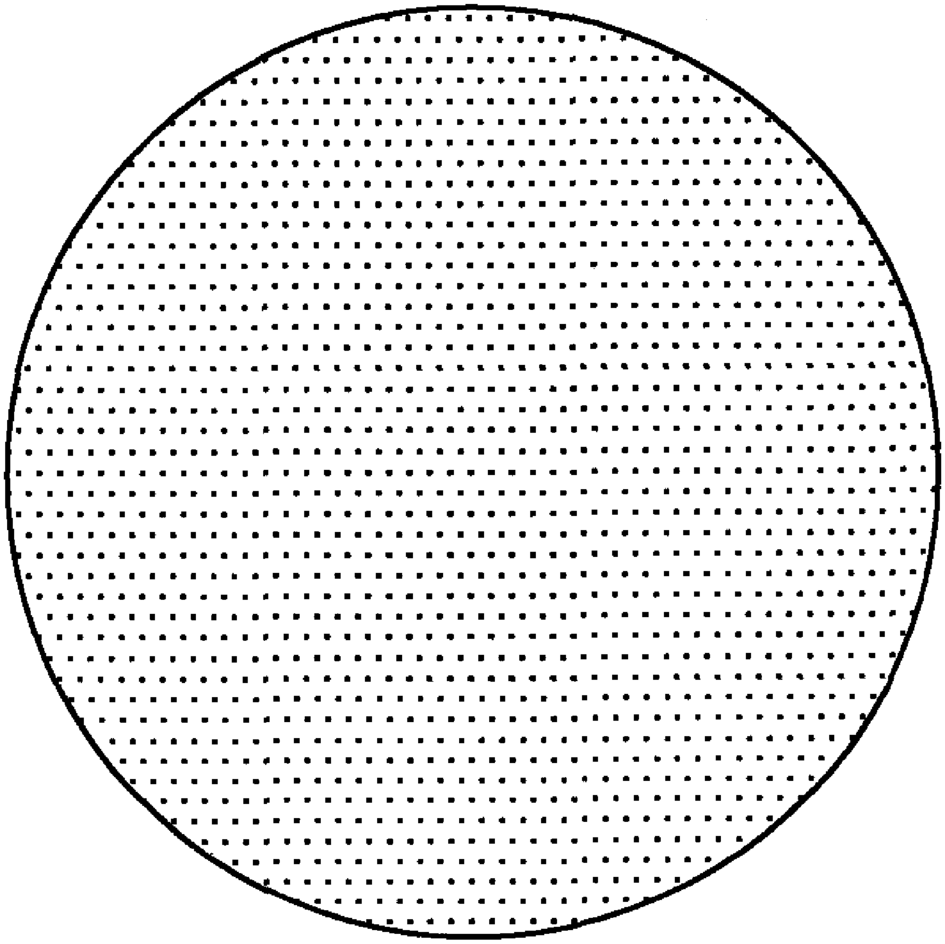
FIG. 4 (PRIOR ART)
FIG. 4 is a photograph of a rimless microchannel plate.
Figure 5:
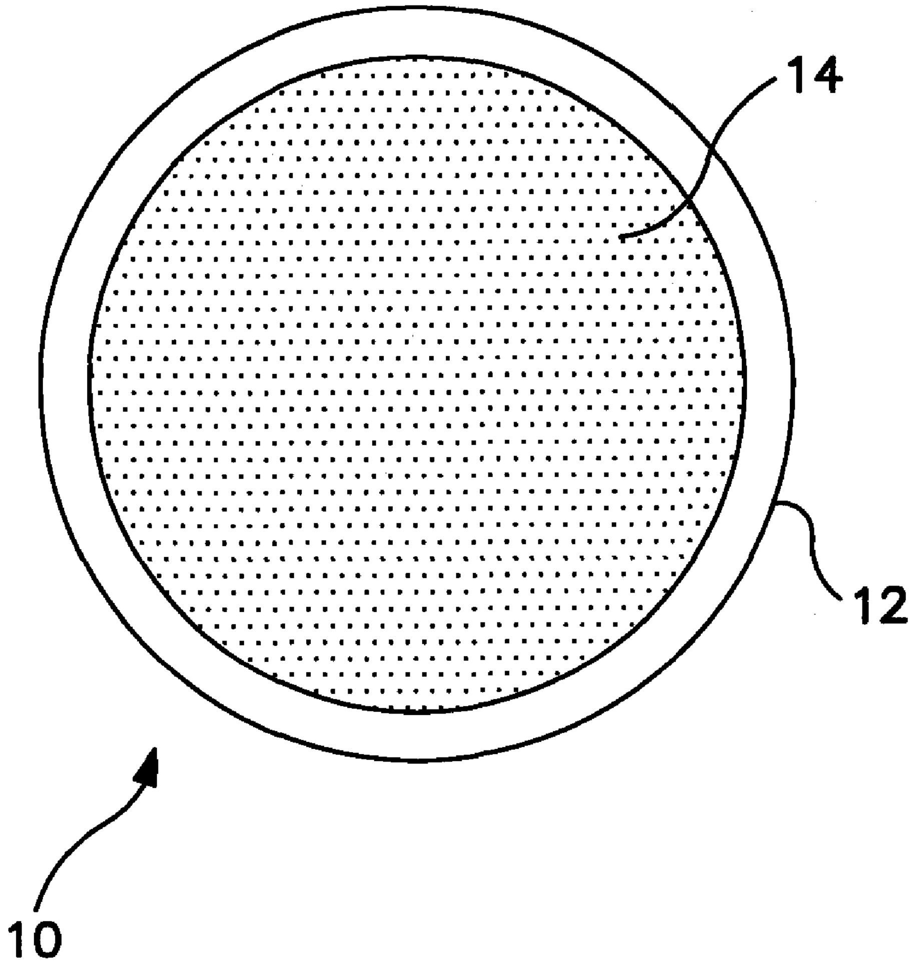
FIG. 5 (PRIOR ART)
FIG. 5 is a photograph of a microchannel plate having a solid glass border.
Figure 6:
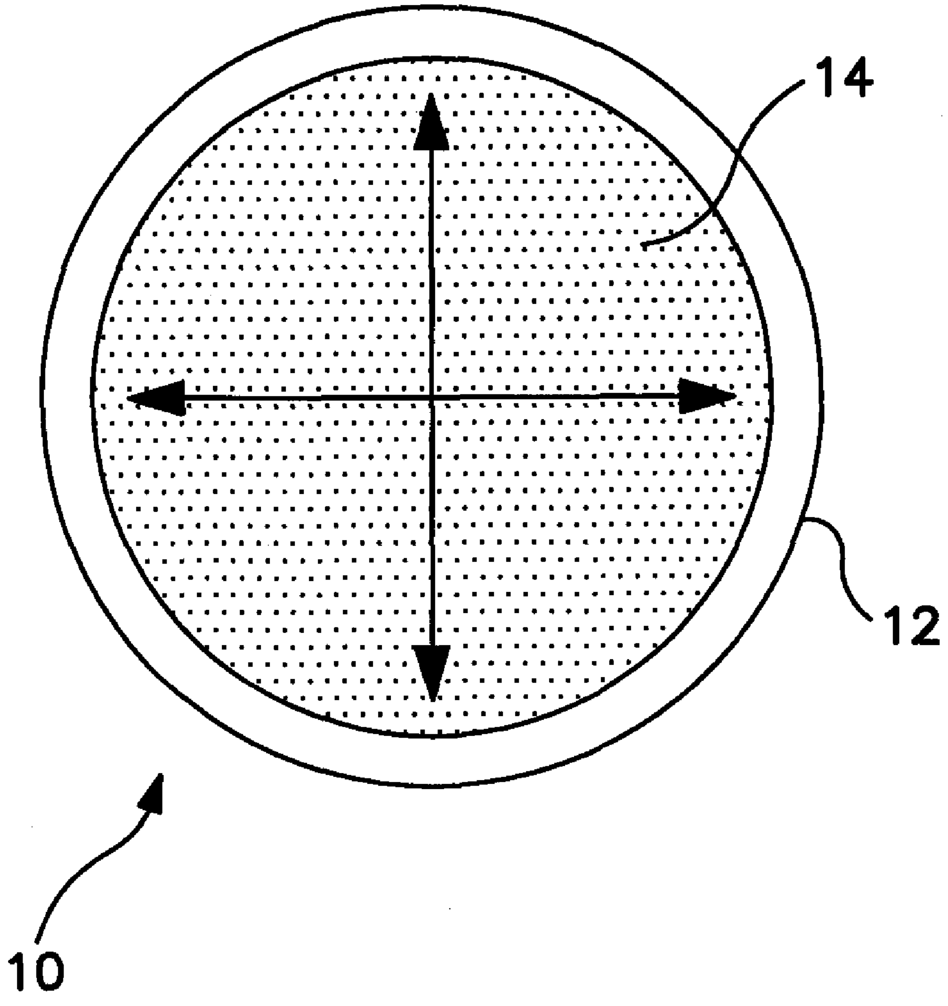
FIG. 6 (PRIOR ART)
FIG. 6 is a photograph of the microchannel plate shown in FIG. 5 with arrows to represent the direction of expansion of the active area of the microchannel plate after hydration.
Figure 7:
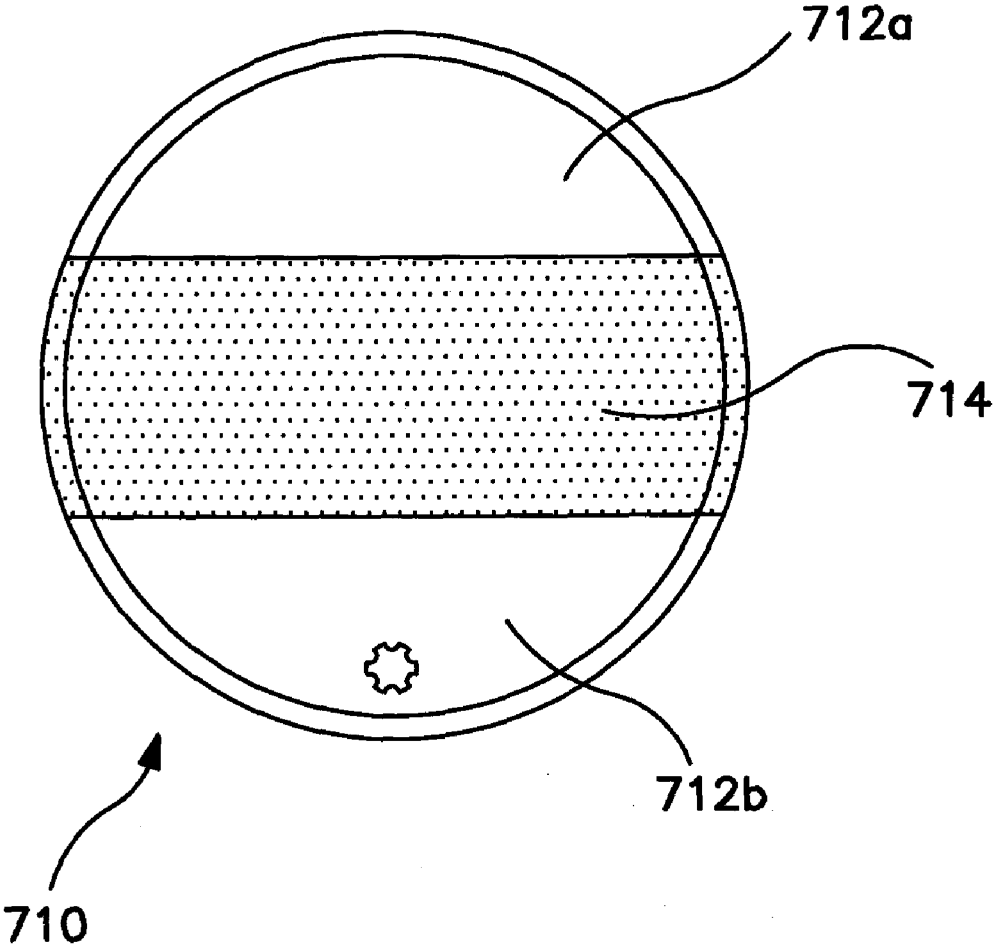
FIG. 7 is a photograph of an embodiment of a microchannel plate according to the present invention.

A new MCP architecture has been developed which meets all the criteria for a mechanically air stable microchannel plate which can be easily mounted without crushing channel walls and producing severe noise phenomena. In the new configuration the active area is not constrained by a continuous glass border. Instead, the glass border used for mounting the microchannel plate is segmented in order to allow for expansion of the active area. FIG. 7 illustrates an experimental embodiment of a microchannel plate 710 according to the present invention. In the arrangement shown in FIG. 7, first and second solid glass pads 712*a* and 712*b* are formed on either side of the active channel area 714. Hydration testing confirmed that the configuration shown in FIG. 7 did not spontaneously crack from exposure to moisture.

Figure 8:
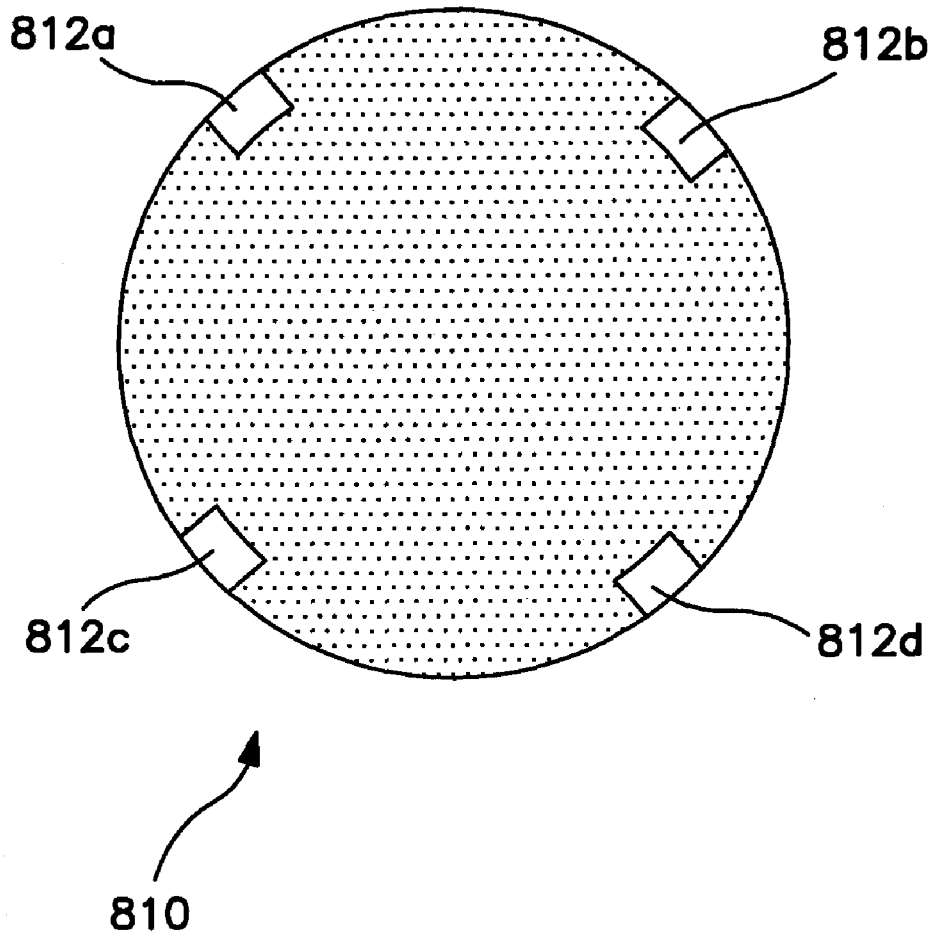
FIG. 8 is a photograph of a second embodiment of a microchannel plate according to the present invention.

FIG. 8 illustrates a preferred arrangement for a microchannel plate according to this invention. In the microchannel plate 810 of FIG. 8, strategically placed mounting pads 812*a*, 812*b*, 812*c*, and 812*d*, composed of solid glass, are disposed about the periphery of the MCP 810. An area 814 of active channels is disposed between and around the mounting pads 812*a*, 812*b*, 812*c*, and 812*d*.

The microchannel plate structure shown in FIGS. 7 and 8 solves the problems caused by expansion of the active areas from the absorption of water vapor. The relatively large spaces between the solid mounting pads allow the active area to swell and expand substantially unimpeded. Microchannel plates according to the present invention were stored in ambient room air for over 12 months and did not show any signs of warping or cracking.

Figure 9:
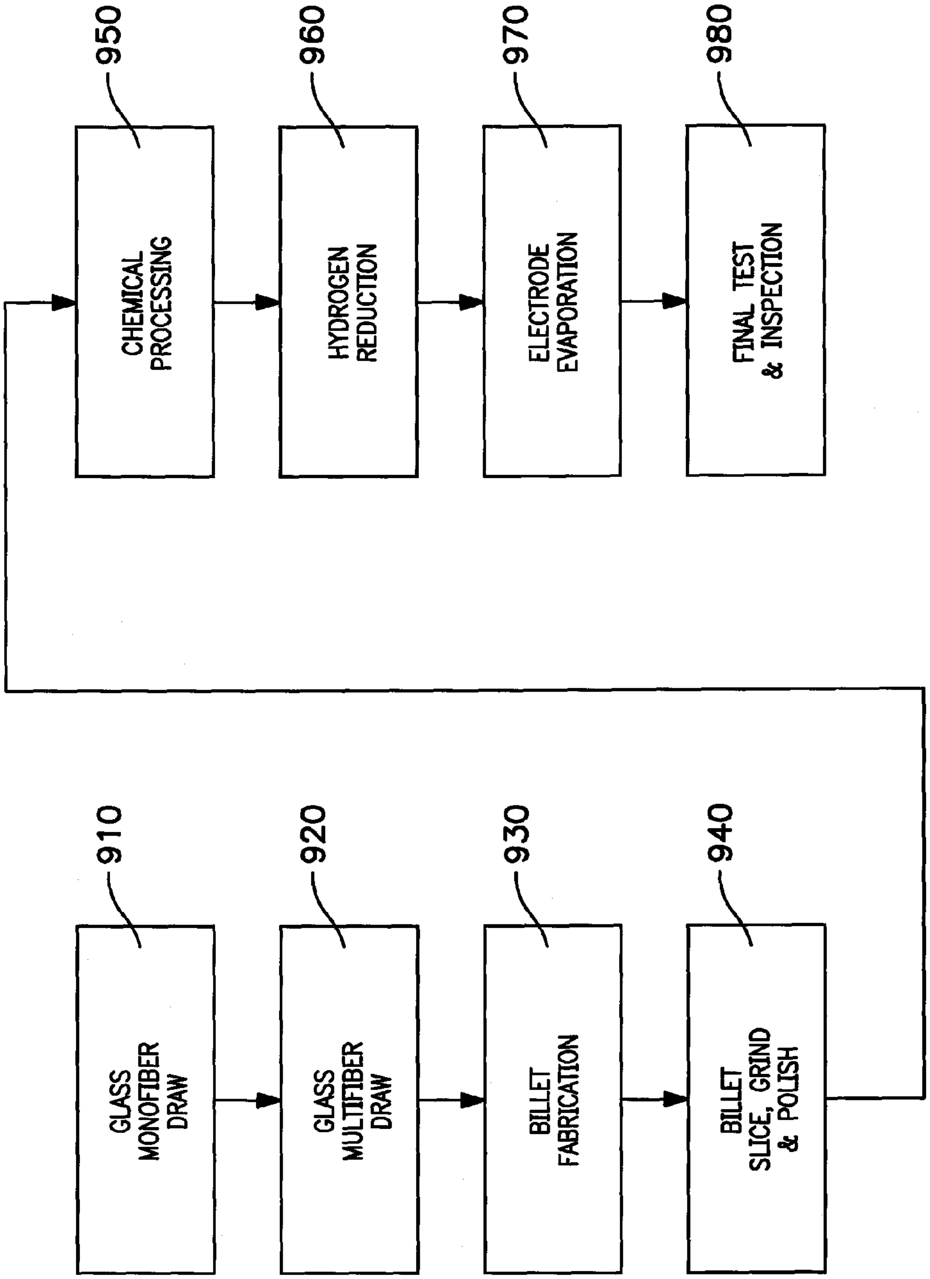
FIG. 9 is a block diagram of the steps performed in fabricating a microchannel plate according to this invention.

FIG. 9 illustrates the major manufacturing steps in the microchannel plate fabrication process according to this invention. Microchannel plates according to the present invention are fabricated through a series of fiber draws and redraws as in steps 910 and 920. The fibers are assembled and then fused together to form a billet as in step 930.

Figure 10:
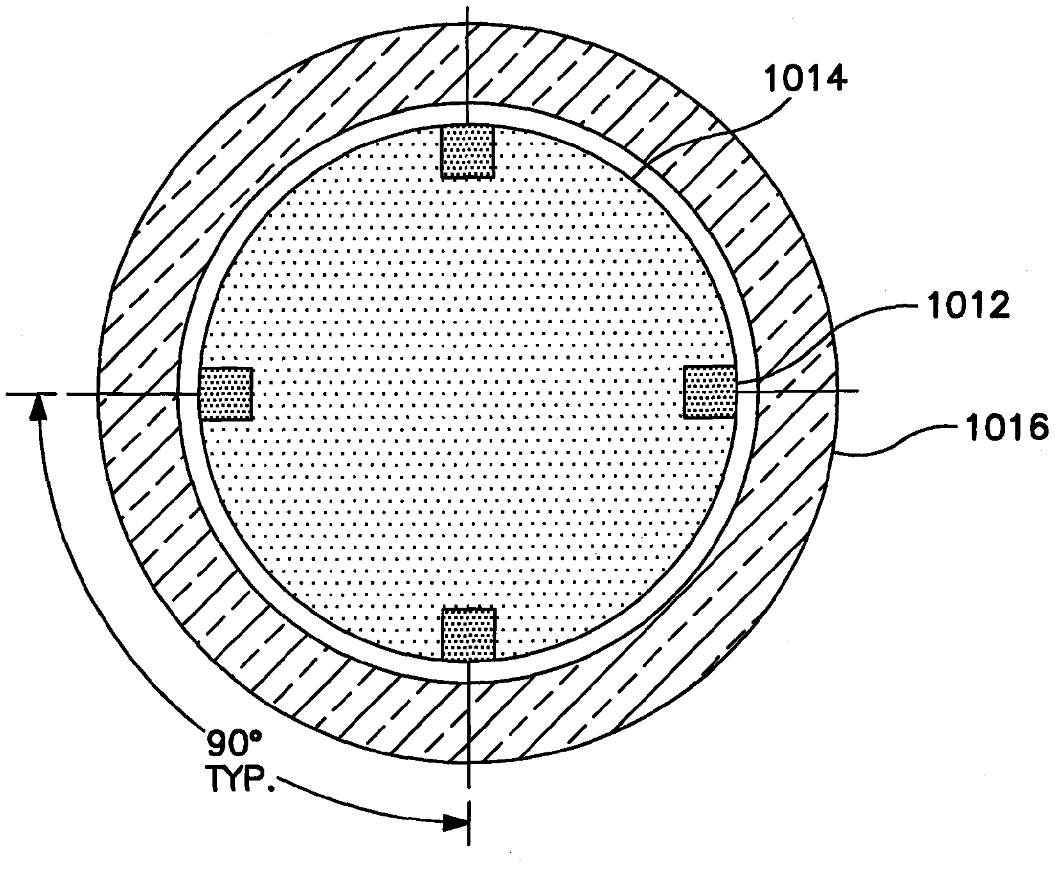
FIG. 10 is an end view of a glass fiber billet being formed in accordance with the present invention.

In making a microchannel billet in accordance with the present invention, the fabricator follows a fabrication drawing to assemble a plurality of multi-fibers in an array, which will become the active channels. Segment arrays of cane fibers, which will become the mounting pads, are inserted into the multi-fiber array in specific areas. FIG. 10 illustrates an example of an assembly of the multi- and cane fibers for fabricating a microchannel plate billet according to this invention. The cane fibers 1012 and the multi-fibers 1014 are placed in a bottle 1016. The cane fibers are arranged within the multi-fibers in quantities and at locations to provide solid glass mounting pads of desired size and at desired locations about the periphery of the multi-fiber array.

Referring back to FIG. 9, after the fibers are arranged in the bottle, they are fused together. The fused billet is then wafered (sliced), ground, and then polished in step 940. The grinding and polishing operations produce a very smooth surface and subsurface finish on the input and output sides of the wafers that become the microchannel plates.

After the grinding and polishing operations, the MCP wafers are subjected to a combination of mechanical and chemical treatments to their surfaces in step 950. The treatments not only produce an optical finish on the MCP, but also cause the solid glass areas (the mounting pads) to become slightly elevated (about 2-10 microns) relative to the active area. The elevated mounting pad areas prevent the trapping of gasses within the channels that lie underneath the mounting hardware when the MCP is mounted in an operative device. Eliminating trapped gas under the mounting hardware permits faster pump down to the desired vacuum, eliminates the generation of plasma, and thereby reduces noise in the array during operation.

After the chemical surface treatments, the MCP wafers are subjected to a hydrogen reduction treatment in step 960. During the manufacturing process, the microchannel plate wafer undergoes significant shrinkage during the cool down process following the hydrogen reduction step. Prior to the present invention, the difference in the shrinkage between the continuous glass rim and the active area frequently caused the MCP to warp in a "potato chip" fashion. The use of the non-continuous (segmented) solid glass mounting pads in accordance with this invention also effectively eliminates the warping effect and thereby increases MCP production yields.

After the hydrogen reduction step 960, the surfaces of the MCP wafers are metallized by evaporative deposition, step 970, to form conductive electrodes on the surfaces. The finished microchannel plates are then given a final test and inspection in step 980.

It will be recognized by those skilled in the art that changes or modifications may be made to the above-described embodiments without departing from the broad inventive concepts of the invention. It is understood, therefore, that the invention is not limited to the particular embodiments which are described, but is intended to cover all modifications and changes within the scope and spirit of the invention as described above and set forth in the appended claims.

What is claimed:

1. A microchannel plate, comprising:

an active area having a plurality of microchannels formed therein and a solid glass pad formed within said active area for mounting the microchannel plate such that shrinkage of the microchannel plate during fabrication and hydration induced swelling of the active area after fabrication of the microchannel plate do not cause warping or cracking of the microchannel plate.

2. A microchannel plate as set forth in claim 1 comprising a second solid glass pad formed within said active area and separated from the first solid glass pad.

3. A microchannel plate as set forth in claim 2 wherein the solid glass pads are formed as discrete islands in the active area.

4. A microchannel plate as set forth in claim 1 comprising a plurality of additional solid glass pads disposed at separate pre-determined locations in the active area of the microchannel plate.

5. A microchannel plate as set forth in any of the preceding claims wherein the solid glass pads are thicker than the active area, thereby enabling degassing of channels located beneath a mounting structure.

6. A microchannel plate as set forth in claim 5 wherein the solid glass pads are disposed around the periphery of the microchannel plate.

* * * * *